United States Patent
Kim et al.

(10) Patent No.: US 9,371,482 B2
(45) Date of Patent: Jun. 21, 2016

(54) LIQUID CRYSTAL COMPOSITION AND LIQUID CRYSTAL DISPLAY DEVICE INCLUDING THE SAME

(71) Applicant: Samsung Display Co., Ltd., Yongin (KR)

(72) Inventors: Taeho Kim, Asan-si (KR); MiSuk Kim, Cheonan-si (KR); Soyoun Park, Hwaseong-si (KR); SiHeun Kim, Asan-si (KR); Daisuke Inoue, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/227,823

(22) Filed: Mar. 27, 2014

(65) Prior Publication Data

US 2015/0070646 A1    Mar. 12, 2015

(30) Foreign Application Priority Data

Sep. 12, 2013 (KR) ........................ 10-2013-0109913

(51) Int. Cl.

| | | |
|---|---|---|
| C09K 19/54 | (2006.01) | |
| C09K 19/20 | (2006.01) | |
| C09K 19/30 | (2006.01) | |
| C09K 19/34 | (2006.01) | |
| C09K 19/12 | (2006.01) | |
| G02F 1/137 | (2006.01) | |
| G02F 1/1343 | (2006.01) | |
| C09K 19/04 | (2006.01) | |
| G02F 1/1362 | (2006.01) | |
| C09K 19/44 | (2006.01) | |

(52) U.S. Cl.

CPC ......... *C09K 19/0403* (2013.01); *C09K 19/3098* (2013.01); *C09K 19/3483* (2013.01); *C09K 19/44* (2013.01); *C09K 19/54* (2013.01); *G02F 1/137* (2013.01); *G02F 1/136286* (2013.01); *C09K 2019/0407* (2013.01); *C09K 2019/0414* (2013.01); *C09K 2019/122* (2013.01); *C09K 2019/123* (2013.01); *C09K 2019/301* (2013.01); *C09K 2019/3004* (2013.01); *C09K 2019/3016* (2013.01); *C09K 2019/3422* (2013.01); *G02F 1/1343* (2013.01); *G02F 2001/13629* (2013.01); *G02F 2001/13712* (2013.01)

(58) Field of Classification Search

CPC .................. C09K 19/42; C09K 19/44; C09K 2019/0407; C09K 2019/0414; C09K 2019/3098; C09K 2019/3483; C09K 19/20; C09K 19/3098; C09K 19/05; C09K 2019/122; C09K 2019/123; C09K 2019/3004; C09K 2019/301; C09K 2019/3016; C09K 2019/3422; G02F 1/1343; G02F 1/134309; G02F 1/137; G02F 2001/13712

See application file for complete search history.

(56) References Cited

U.S. PATENT DOCUMENTS

| | | |
|---|---|---|
| 2002/0127354 A1 | 9/2002 | Kobayashi et al. |
| 2011/0019116 A1 | 1/2011 | Iwakabe et al. |
| 2011/0253938 A1 | 10/2011 | Klasen-Memmer et al. |
| 2012/0268706 A1 | 10/2012 | Goebel et al. |
| 2013/0183460 A1* | 7/2013 | Klasen-Memmer . C09K 19/062 428/1.4 |

FOREIGN PATENT DOCUMENTS

| | | |
|---|---|---|
| KR | 10-0889710 | 3/2009 |
| WO | WO 2014208318 A1 * | 12/2014 |

* cited by examiner

*Primary Examiner* — Shean C Wu

(74) *Attorney, Agent, or Firm* — H.C. Park Associates, PLC (57) ABSTRACT

A liquid crystal display device includes a first substrate including at least one electrode configured to form an electric field, a second substrate facing the first substrate, and a liquid crystal layer disposed between the first substrate and the second substrate. The liquid crystal layer includes liquid crystal of negative dielectric anisotropy, an additive, and a derivative of the additive.

22 Claims, 3 Drawing Sheets

LIQUID CRYSTAL COMPOSITION AND LIQUID CRYSTAL DISPLAY DEVICE INCLUDING THE SAME

CROSS-REFERENCE TO RELATED APPLICATION

This application claims priority from and the benefit of Korean Patent Application No. 10-2013-0109913, filed on Sep. 12, 2013, which is incorporated by reference for all purposes as if set forth herein.

BACKGROUND

1. Field

Exemplary embodiments relate to a liquid crystal composition and a liquid crystal display device including the same, and, more particularly, to a liquid crystal composition and a liquid crystal display device having a relatively high transmittance, a relatively high voltage holding ratio, and decreased defects.

2. Discussion

Conventional liquid crystal display devices typically include a first substrate including a plurality of pixel electrodes, a second substrate including a common electrode, and a liquid crystal layer disposed between the first substrate and the second substrate. These liquid crystal display devices display images by changing (or otherwise controlling) the transmittance of light through the liquid crystal layer according to an electric field formed between the pixel electrodes and the common electrode. It is noted that conventional liquid crystal display devices usually include a plurality of pixels, each of which include a pixel electrode.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a liquid crystal composition and a liquid crystal display device having a relatively high transmittance and a high voltage holding ratio. The liquid crystal display device is also configured to display images of a relatively high quality and prevent (or at least reduce) the transformation of liquid crystal.

Additional aspects will be set forth in the detailed description which follows, and, in part, will be apparent from the disclosure, or may be learned by practice of the inventive concept.

According to exemplary embodiments, a liquid crystal display device includes a first substrate including at least one electrode configured to form an electric field, a second substrate facing the first substrate, and a liquid crystal layer disposed between the first substrate and the second substrate. The liquid crystal layer includes liquid crystal of negative dielectric anisotropy, a first additive represented by Chemical Formula 1, and a derivative of the first additive.

Chemical Formula 1 is:

According to exemplary embodiments, a liquid crystal composition includes liquid crystal of negative dielectric anisotropy, a first additive represented by the aforementioned Chemical Formula 1, and a derivative of the first additive.

According to exemplary embodiments, a light transmittance and a voltage holding ratio of a liquid crystal display device may be improved and the transformation of liquid crystals thereof may be prevented (or at least reduced). In this manner, defects that may be generated as a result of the transformation of the liquid crystals (e.g., defects, such as, for example, stains, linear afterimages, surface afterimages, etc.) may be decreased or removed.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
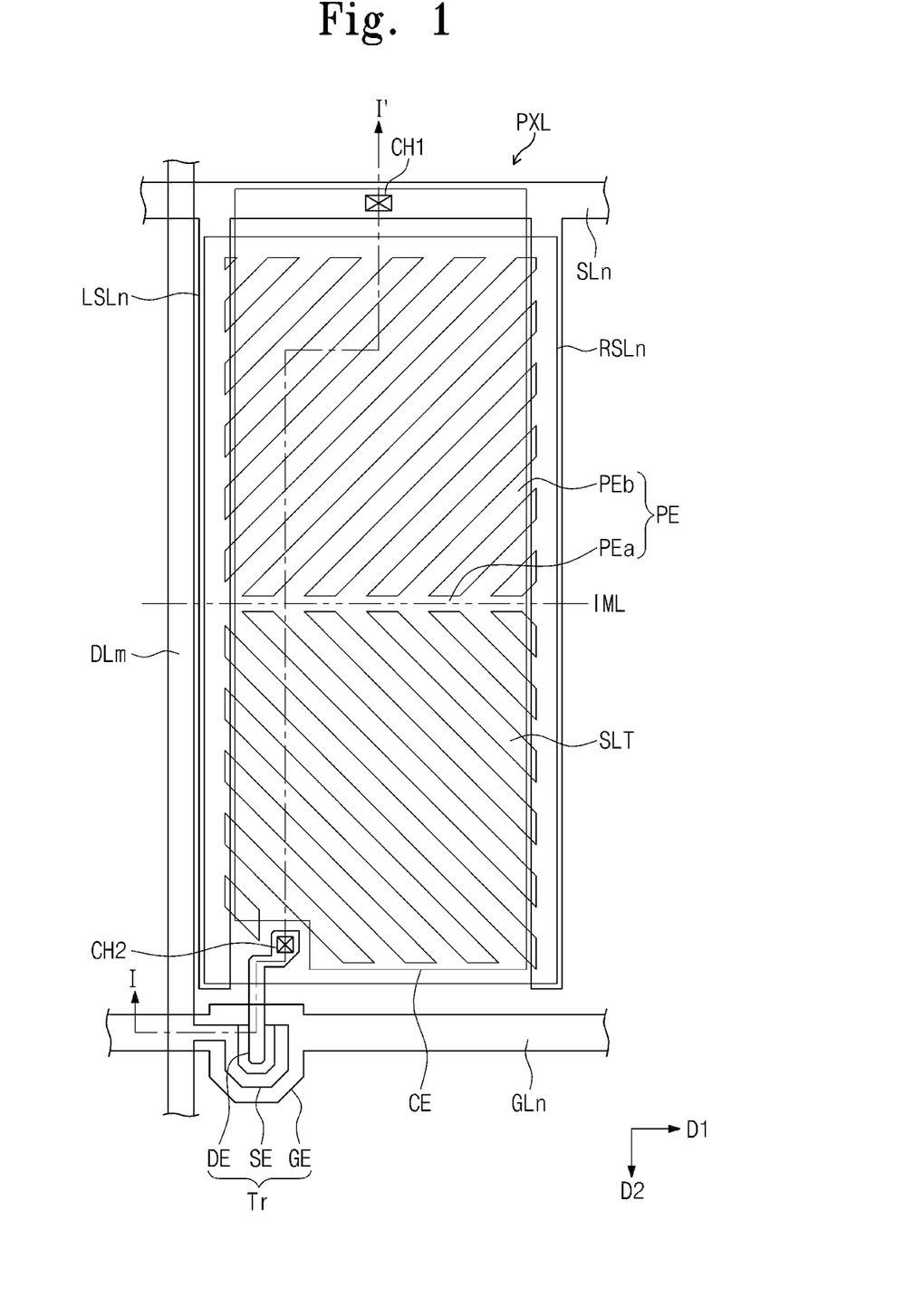
FIG. 1 is a plan view of a portion of a liquid crystal display device, according to exemplary embodiments.
Figure 2:
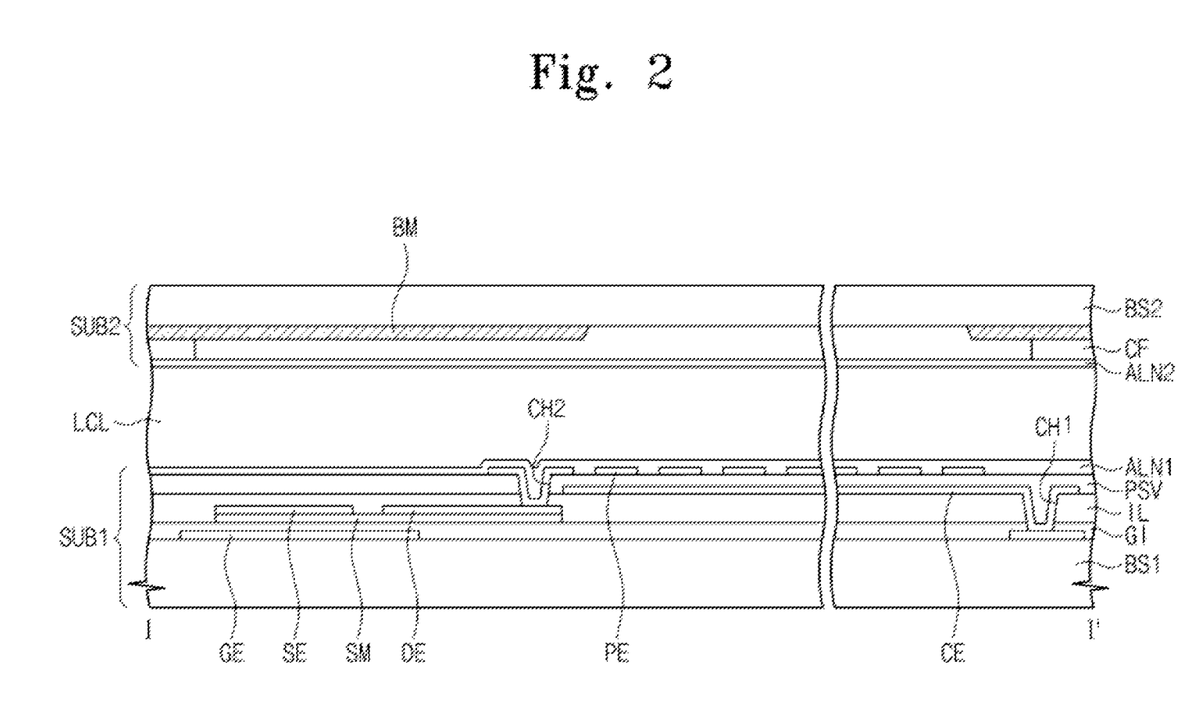
FIG. 2 is a cross-sectional view of the liquid crystal display device of FIG. 1 taken along sectional line I-I', according to exemplary embodiments.

FIG. 1 is a plan view of a portion of a liquid crystal display device, according to exemplary embodiments. FIG. 2 is a cross-sectional view of the liquid crystal display device of FIG. 1 taken along sectional line IT.

Referring to FIGS. 1 and 2, the liquid crystal display device may include a first substrate SUB1, a second substrate SUB2 facing the first substrate SUB1, and a liquid crystal layer LCL disposed between the first substrate SUB1 and the second substrate SUB2.

The first substrate SUB1 may include a first base substrate BS1, a plurality of gate lines GLn, a plurality of data lines DLm, a plurality of pixels PXL, and a first alignment layer ALN1. It is noted that "n" and "m" are natural numbers greater than zero. To this end, "n" and "m" may be equal to or different from one another.

According to exemplary embodiments, the first substrate SUB1 includes a plurality of pixel areas arranged in a matrix shape (or formation). It is noted, however, that any other suitable arrangement of pixel areas may be utilized. Each of the plurality of pixels PXL corresponds to one of the pixel areas. For illustrative and descriptive convenience, a representative pixel area associated with an n-th gate line GLn among the plurality of gate lines GLn, and an m-th data line DLm among the plurality of data lines DLm, is illustrated in FIGS. 1 and 2. It is noted that the rest of the pixels PXL may have a substantially similar structure. To this end, the n-th gate line GLn and the m-th data line DLm will be, hereinafter, respectively referred to as a (or the) gate line GLn and a (or the) data line DLm.

The gate line GLn is formed on the first base substrate BS1 and extends in a first direction D1. The data line DLm extends in a second direction D2 crossing the first direction D1. A gate insulating layer GI is formed between the data line DLm and the gate line GLn. The gate insulating layer GI is provided on the entire (or substantially entire) surface of the first base substrate BS1 and, thereby, covers the gate line GLn.

Each of the pixels PXL is connected to a corresponding gate line GLn among the plurality of gate lines GLn and to a corresponding data line DLm among the plurality of data lines DLm. Each of the pixels PXL includes a thin film transistor Tr, an electrode part connected to the thin film transistor Tr, and a storage electrode part. The electrode part includes a pixel electrode PE and a common electrode CE insulated from the pixel electrode PE. The thin film transistor Tr includes a gate electrode GE, a gate insulating layer GI, a semiconductor pattern SM, a source electrode SE, and a drain electrode DE.

The gate electrode GE extends (or otherwise protrudes) from the gate line GLn or is provided on a portion of the gate line GLn. The gate electrode GE may be formed of any suitable conductive material, such as a conductive metal material. The gate electrode GE may be formed of, for example, at least one of nickel, chromium, molybdenum, aluminum, titanium, copper, tungsten, etc., and one or more alloys thereof. The gate electrode GE may be formed as a single layer structure or a multi-layer structure using one or more of the conductive materials, e.g., one or more of the aforementioned metal materials. For example, the gate electrode GE may be a triple layer structure including a stacked formation of a molybdenum layer, an aluminum layer, and a molybdenum layer. As another example, the gate electrode GE may be a double layer structure including a stacked formation of a titanium layer and a copper layer. It is also contemplated, for example, that the gate electrode GE may be a single layer formation using an alloy of titanium and copper. Any other suitable structures and/or materials may be utilized in association with exemplary embodiments described herein.

The semiconductor pattern (or layer) SM is provided on the gate insulating layer GI. That is, the semiconductor pattern SM is provided on the gate electrode GE with the gate insulating layer GI formed therebetween. A portion of the semiconductor pattern SM overlaps a portion of the gate electrode GE. The semiconductor pattern SM may include an active pattern (not illustrated) provided on the gate insulating layer GI, and an ohmic contact layer (not illustrated) formed on the active pattern. The active pattern may be formed of any suitable material, such as, for example, amorphous silicon, and the ohmic contact layer may be formed of any suitable material, such as, for example, a thin film of n+ amorphous silicon. The ohmic contact layer may make respective ohmic contacts between the active pattern and the source electrode SE and the drain electrode DE.

According to exemplary embodiments, the source electrode SE may be branched (or extended) from the data line DLm. The source electrode SE may be formed on the ohmic contact layer, and a portion of the source electrode SE may overlap with a portion of the gate electrode GE. The drain electrode DE may be spaced apart from the source electrode SE with the semiconductor pattern SM disposed therebetween. It is noted, however, that the semiconductor pattern SM may be disposed in a different layer than the source electrode SE and the drain electrode DE. The drain electrode DE may be formed on the ohmic contact layer, and a portion of the drain electrode DE may be provided to overlap a portion of the gate electrode GE.

The source electrode SE and the drain electrode DE may be formed of any suitable material, such as, for example, at least one of chromium, molybdenum, aluminum, titanium, copper, tungsten, etc., and one or more alloys thereof. The source electrode SE and the drain electrode DE may be formed as a single layer structure or a multi-layer structure using one or more of the materials. For example, the source electrode SE and the drain electrode DE may be a double layer structure including a stacked formation of a titanium layer and a copper layer. It is also contemplated that the source electrode SE and the drain electrode DE may be a single layer formation of an alloy of titanium and copper. Any other suitable structure and/or materials may be utilized in association with exemplary embodiments described herein.

According to exemplary embodiments, an upper surface of the active pattern disposed between the source electrode SE and the drain electrode DE may be exposed and may be a channel part forming a conductive channel between the source electrode SE and the drain electrode DE according to the application of voltage via the gate electrode GE. Respective portions of the source electrode SE and the drain electrode DE overlap with corresponding portions of the semiconductor pattern SM, excluding the channel part formed between the separated portion of the source electrode SE and the drain electrode DE.

An interlayer IL may be provided on the thin film transistor Tr. The interlayer IL may cover the source electrode SE, the drain electrode DE, the channel part, and the gate insulating layer GI. The interlayer IL may be formed of any suitable insulating material.

In exemplary embodiments, the common electrode CE may be provided on the interlayer IL. The common electrode CE may have an approximately rectangular shape when viewed in a plan view. It is noted, however, that the shape of the common electrode CE is not limited thereto, and, as such, any suitable shape(s) may be utilized according to the shape of the pixels PXL. The common electrode CE may be formed as a plate, and may not include a pattern, such as a slit. Further, the common electrode CE may be formed of any suitable material, such as, for example, any suitable transparent conductive material. For instance, the common electrode CE may be formed of a conductive metal oxide, such as aluminum zinc oxide (AZO), gallium zinc oxide (GZO), indium tin oxide (ITO), indium zinc oxide (IZO), indium tin zinc oxide (ITZO), etc. It is also contemplated that one or more conductive polymers (ICP) may be utilized, such as, for example, polyaniline, poly(3,4-ethylenedioxythiophene) poly(styrenesulfonate) (PEDOT:PSS), etc.

The storage electrode part may overlap at least a portion of the common electrode CE and form a storage capacitor therewith. The storage electrode part may be formed on the first base substrate BS1 and may extend in the first direction D1. The storage electrode part may be separated (or otherwise spaced apart) from the gate line GLn when viewed in a plan view. The storage electrode part may further include a storage line SLn extending in the first direction D1, and first and second branch electrodes LSLn and RSLn branching from the storage line SLn and extending in the second direction D2. The storage line SLn may be formed of the same material as the gate line GLn, and may be formed using a patterning process that forms the gate line GLn.

A first contact hole CH1 exposing a portion of the storage electrode part, particularly, a portion of the storage line SLn, may be formed through the gate insulating layer GI and the interlayer IL by partially removing the gate insulating layer GI and the interlayer IL using any suitable process. The common electrode CE may be connected to the storage electrode part through the first contact hole CH1. In this manner, a common voltage having the same level may be applied to the storage line SLn and the common electrode CE. Since the common voltage may be applied to the common electrode CE of each pixel through the storage line SLn, voltage having a uniform level may be applied to the common electrode CE without inducing a voltage drop over a whole (or substantially whole) display area.

A passivation layer PSV may be provided on the interlayer IL. The passivation layer PSV may be formed of any suitable insulating material, such as, for example, an organic insulating material or an inorganic insulating material.

A pixel electrode PE may be provided on the passivation layer PSV. The pixel electrode PE may overlap with a portion of the common electrode CE when viewed in a plan view. The pixel electrode PE may form an electric field (for example, a fringe electric field) with the common electrode CE based on one or more voltages applied to the thin film transistor Tr. The pixel electrode PE may include a plurality of slits SLT formed by removing a portion of the pixel electrode PE using any suitable process. The slits SLT may be extend in a slanted direction with respect to the first direction D1 and/or the second direction D2. In addition, the pixel electrode PE may have a plurality of areas formed by the slits SLT having different slanted directions from each other. In this manner, the areas may be substantially line symmetric with respect to an imaginary line IML crossing the pixel PXL or may be substantially point symmetric with respect to a point in the pixel PXL. As seen in FIG. 1, the slits SLT are formed to have a line symmetric shape with respect to an imaginary line IML crossing the pixel PXL in the first direction D1.

According to exemplary embodiments, the pixel electrode PE may include a stem part PEa formed in each pixel PXL and a plurality of branch parts PEb divided by the slits SLT and extending from the stem part PEa. The branch parts PEb may be separated from one another by a constant or variable distance. The branch parts PEb of the pixel electrode PE may form an electric field with the common electrode CE. Further, first ones of the branch parts PEb may extend in a direction parallel to each other and second ones of the branch parts PEb may extend in a different direction parallel to each other. The stem part PEa and the branch parts PEb may be provided in various shapes. For example, the branch parts PEb may extend in both directions perpendicular to the extended direction of the stem part PEa. Alternatively, the stem part PEa may be formed to have a shape bent many times. As with the common electrode CE, the pixel electrode PE may be formed of any suitable material, such as, for example, any suitable transparent conductive material. For instance, the pixel electrode PE may be formed of a conductive metal oxide, such as, for example, AZO, GZO, ITO, IZO, ITZO, etc. It is also contemplated that one or more ICPs may be utilized, such as, for example, polyaniline, PEDOT:PSS, etc.

The interlayer IL and the passivation layer PSV may be partially removed to form a second contact hole CH2 exposing a portion of the drain electrode DE. The pixel electrode PE may be connected to the drain electrode DE through the second contact hole CH2.

The pixel electrode PE may partially overlap a portion of the storage line SLn, as well as partially overlap portions of the first and second branch electrodes LSLn and RSLn to form a storage capacitor.

The first alignment layer ALN1 may be provided on the first base substrate BS1 including the pixel electrode PE formed thereon. In this manner, the first alignment layer ALN1 may align liquid crystal molecules (not shown) of the liquid crystal layer LCL. The first alignment layer ALN1 may include any suitable organic polymer, such as, for example, a polymer, e.g., polyimide, polyamic acid, polyamide, polyamic imide, polyester, polyethylene, polyurethane, and polystyrene, or a mixture thereof.

The second substrate SUB2 may include a second base substrate BS2, color filters CF, a black matrix BM, and a second alignment layer ALN2.

The color filters CF may be formed to impart the light penetrating the liquid crystal layer LCL with color. The color filters CF may include any suitable colors, such as, for example, a red color filter, a green color filter, and a blue color filter. The red color filter, the green color filter, or the blue color filter may be formed in one to one correspondence with respective ones of the pixels PXL. The black matrix BM may be disposed to block light to prevent the light from leaking out between neighboring pixels.

The second alignment layer ALN2 may be provided on the color filters CF, and may align the liquid crystal molecules (not shown) of the liquid crystal layer LCL along with the first alignment layer ALN1. The material of the second alignment layer ALN2 may be the same as or different from the material of the first alignment layer ALN1.

The liquid crystal layer LCL, including the liquid crystal molecules (not shown) may be provided between the first substrate SUB1 and the second substrate SUB2. The liquid crystal layer LCL may include liquid crystal molecules having negative dielectric anisotropy. The liquid crystal layer LCL may include a liquid crystal composition containing an alkenyl-based liquid crystal, an additive, and a derivative of the additive. The liquid crystal composition may further include an alkoxy-based liquid crystal, a terphenyl-based liquid crystal, and any other suitable liquid crystal other than the alkenyl-based, the alkoxy-based, and the terphenyl-based liquid crystal.

According to exemplary embodiments, the liquid crystal layer LCL may further include at least one of the liquid crystals of the following Chemical Formula 2.

Chemical Formula 2

When the liquid crystals of the above Chemical Formula 2 are referred to as the first liquid crystal to the third liquid crystal in the order shown above, from about 30 to about 40 parts by weight of the first liquid crystal, from about 5 to about 30 parts by weight of the second liquid crystal, and from about 3 to about 10 parts by weight of the third liquid crystal may be included in the liquid crystal layer LCL.

The liquid crystal layer LCL may further include at least one of the liquid crystals of the following Chemical Formula 3.

Chemical Formula 3

-continued

When the liquid crystals of the above Chemical Formula 3 are referred to as the fourth liquid crystal to the eleventh liquid crystal in the order shown above, from about 0 to about 15 parts by weight of the fourth liquid crystal, from about 0 to about 15 parts by weight of the fifth liquid crystal, from about 0 to about 10 parts by weight of the sixth liquid crystal, from about 0 to about 10 parts by weight of the seventh liquid crystal, from about 0 to about 25 parts by weight of the eighth liquid crystal, from about 0 to about 15 parts by weigh of the ninth liquid crystal, from about 0 to about 15 parts by weight of the tenth liquid crystal, and from about 0 to about 15 parts by weight of the eleventh liquid crystal may be included in the liquid crystal layer LCL.

According to exemplary embodiments, the liquid crystal layer LCL may include at least one of the liquid crystals of the following Chemical Formula 4.

Chemical Formula 4

When the liquid crystals of the above Chemical Formula 4 are referred to as the first liquid crystal to the fourth liquid crystal in the order shown above, from about 30 to about 40 parts by weight of the first liquid crystal, from about 5 to about 17 parts by weight of the second liquid crystal, from about 5 to about 28 parts by weight of the third liquid crystal, and from about 15 to about 25 parts by weight of the fourth liquid crystal may be included in the liquid crystal layer LCL.

According to exemplary embodiments, the liquid crystal layer LCL may further include at least one of the liquid crystals of the following Chemical Formula 5.

Chemical Formula 5

When the liquid crystals of the above Chemical Formula 5 are referred to as the fifth liquid crystal to the ninth liquid crystal in the order shown above, from about 0 to about 15 parts by weight of the fifth liquid crystal, from about 0 to about 18 parts by weight of the sixth liquid crystal, from about 0 to about 15 parts by weight of the seventh liquid crystal, from about 0 to about 13 parts by weight of the eighth liquid crystal, and from about 0 to about 10 parts by weigh of the ninth liquid crystal may be included in the liquid crystal layer LCL.

In the above Chemical Formulae 2 to 5, each of R and R' each represents an alkyl group or an alkenyl group having 1 to 5 carbon atoms, but R and R' do not both represent an alkyl group.

The additive may prevent (or otherwise reduce) the oxidation of the alkenyl-based liquid crystal during a manufacturing process of the liquid crystal display device or thereafter without decreasing the optical properties of the liquid crystal display device. The additive may also prevent (or otherwise reduce) the oxidation of liquid crystals including a functional group having relatively high reactivity other than the alkenyl-based liquid crystal.

The derivative of the additive refers to an intermediate or a resultant obtained as a by-product of the additive, which may be generated during the prevention of the oxidation of the alkenyl-based liquid crystal.

The additive may be included in the liquid crystal composition in a concentration of about 100 ppm to about 1,000 ppm based on the total amount of the liquid crystal composition. The additive and the derivative of the additive may be included in the liquid crystal composition in a concentration of greater than 100 ppm to about 1,000 ppm based on the total amount of the liquid crystal composition. When an excessive amount of the additive above the aforementioned upper limit is included, the reaction of the additive may be excessively conducted, and precipitation may occur. When a lesser amount of the additive below the aforementioned lower limit is included, oxidation of the liquid crystal may be insufficiently prevented.

According to exemplary embodiments, the additive may be a hindered amine light stabilizer and/or a phenolic additive. The hindered amine light stabilizer may be a compound represented by the following Chemical Formula 1, and the phenolic additive may be a compound represented by the following Chemical Formula 6.

Chemical Formula 1

Chemical Formula 6

In Chemical Formula 6, w is 1 to 15.

According to exemplary embodiments, when a gate signal is applied to the gate line GLn, the thin film transistor Tr may be "turned-on." In this manner, a data signal applied to the data line DLm may be applied to the pixel electrode PE via the thin film transistor Tr. When the thin film transistor Tr is turned-on, and the data signal is applied to the pixel electrode PE, an electric field may be formed between the pixel electrode PE and the common electrode CE. The electric field formed by the difference between the voltages applied to the common electrode CE and the pixel electrode PE may control the orientation of the liquid crystal molecules of the liquid crystal layer LCL. In this manner, the dosage of light penetrating the liquid crystal layer LCL may be changed, and an image may be displayed.

The liquid crystal display device, according to exemplary embodiments, may have various pixel structures. For instance, two gate lines and one data line may be connected to one pixel PXL. As another example, one gate line and two data lines may be connected to one pixel PXL. Further, a pixel PXL may include two subpixels to which two different voltages are applied. In this manner, a relatively high voltage may be applied to one subpixel and relatively low voltage may be applied to another subpixel.

A liquid crystal display device structure including a pixel electrode PE having a plurality of slits STL and a common electrode CE of a plate shape has been explained; however, it is contemplated that any other suitable structure may be utilized. For example, the common electrode CE may include a plurality of slits SLT, and the pixel electrode PE may be formed as plate. In this manner, the common electrode CE may be provided on the pixel electrode PE. Further, each of the pixel electrode PE and the common electrode CE may include a stem part and branch parts extending from the stem part even though not illustrated herein. In this manner, the branch parts of the pixel electrode PE and the branch parts of the common electrode CE may be alternately disposed when viewed in a plan view.

According to exemplary embodiments, the liquid crystal display device having the above-described structure may be driven in a plane-to-line switching (PLS) mode. A conventional PLS mode liquid crystal display device may utilize liquid crystals having positive dielectric anisotropy ($\Delta\in$). In a PLS mode liquid crystal display device including liquid crystals having positive dielectric anisotropy, the liquid crystals may be pretilted in a direction parallel to the electrode. In this manner, the splay (or spread) angle of the liquid crystals may be relatively large and rotational elastic energy may be relatively small when an electric field is applied.

However, in exemplary embodiments, the liquid crystal display device may include liquid crystals having negative dielectric anisotropy. In this manner, the transmittance at the center portions of the pixel electrode PE and the common electrode CE and at the center portion of each slit may be relatively high when compared with that obtained when using liquid crystals having positive dielectric anisotropy. In a PLS mode, liquid crystal display including liquid crystals having negative dielectric anisotropy, the liquid crystals may become pretilted in a perpendicular (or substantially perpendicular) direction to the electrode. In this manner, the splay angle may be relatively small and the rotational elastic energy may be relatively large as compared to the liquid crystals having the positive dielectric anisotropy.

According to exemplary embodiments, a PLS mode liquid crystal display device including an exemplary composition of liquid crystal molecules may prevent (or at least reduce) afterimages, such as, for instance, line afterimages. It is noted that afterimages may otherwise be generated by a side reaction in the liquid crystal layer LCL when energy, such as ultraviolet light, is applied to the liquid crystals when driving the liquid crystal display device. The side reaction includes decomposition of the liquid crystal due to the ultraviolet light, etc., and decomposition of other materials other than the liquid crystal included in the liquid crystal layer LCL. That is, when the ultraviolet light is applied to the liquid crystals in the liquid crystal layer LCL, radicals may be generated in the liquid crystal.

The following Chemical Formula 7, an illustrative mechanism of generating the radical in the liquid crystals when polyimide is used in the first alignment layer ALN1 and the second alignment layer ALN2 is shown. R represents the rest part excluding an alkenyl group from an alkenyl-based liquid crystal, and $R_2$ represents a functional group (for example, an alkyl group) produced from the polyimide.

Chemical Formula 7

The radical may react with a relatively strong reactive group, for example, the alkenyl group of the liquid crystals and produce ionic impurities. The ionic impurities produced by the side reaction may be accumulated at the border portion of an image pattern when forming an image. In this manner, an afterimage may be generated.

According to exemplary embodiments, however, an additive capable of reacting with the radicals or ions produced from the side reaction is used. In this manner, generation of the afterimage due to the ionic impurities may be prevented (or at least reduced). The additive may function as an H donor or a radical scavenger to prevent the reaction of other liquid crystals with the radicals or the ions. For example, when unstable free radicals, such as peroxide radicals, are generated, the additive may react with the peroxide radical to prevent (or reduce) the conductance of an additional radical chain reaction with other liquid crystal molecules. That is, the additive of the above Chemical Formula 1 may react with an alkyl radical to remove the alkyl radical, and the additive of the above Chemical Formula 6 may react with the peroxide radical to remove the peroxide radical.

In exemplary embodiments, the additive may be transformed into a derivative of the additive through the reaction with the radicals. The following Chemical Formula 8 illustrates the reaction of the produced peroxide radical with the hindered amine light stabilizer.

Chemical Formula 8

It is noted that the R is set up to show the production of the peroxide, which may be a functional group (for example, an alkyl group having 1 to 12 carbon atoms) connected to the peroxide produced in an aligning solution, but is not limited thereto. In the hindered amine light stabilizer, a part not participating in the reaction may be omitted except for a piperidine group.

The following Chemical Formula 9 illustrates a process of forming a radical through the oxidation of organic materials and a reaction of a generated peroxide radical with a phenolic additive.

Chemical Formula 9

It is noted that R is set up to show the production of the peroxide, which may be a functional group (for example, an alkyl group having 1 to 12 carbon atoms) connected to the peroxide produced in an aligning solution, but is not limited thereto. $R_1$ to $R_3$ represent substituents connected to phenol, but are not limited thereto. For example, each of R1 and R2 may be an ethyl group, and R3 may be an alkyl group having 1 to 15 carbon atoms. This compound corresponds to the phenolic additive of Chemical Formula 6.

According to exemplary embodiments, the liquid crystal display device having the above-described structure and manufactured by the above-described method, by prevent or reduce the transformation of the liquid crystals. As such, the decrease of the voltage holding ratio of a pixel may be prevented (or reduced), and defects that may otherwise be generated due to the transformation of the liquid crystal, such as stains, line afterimages, and surface afterimages, or the like, may be decreased or removed.

Hereinafter, a few exemplary embodiments are provided and compared.

1. Exemplary Liquid Crystal Compositions

Exemplary liquid crystal compositions are illustrated in Tables 1 and 2 provided below.

TABLE 1

| Liquid Crystal | Structure of Liquid Crystal | Exemplary Liquid Crystal Compositions (wt %) | | | |
|---|---|---|---|---|---|
| | | 1 | 2 | 3 | 4 |
| 1 | R—⬡—⬡—R' | 37 | 34 | 34 | 32 |

TABLE 1-continued

| Liquid Crystal | Structure of Liquid Crystal | Exemplary Liquid Crystal Compositions (wt %) | | | |
|---|---|---|---|---|---|
| | | 1 | 2 | 3 | 4 |
| 2 | R—[Cy]—[Cy]—CH₂—O—[Ph(F,F)]—OR' | 28 | 30 | 6 | 17 |
| 3 | R—[Ph]—[Ph(F,F)]—[Ph]—R' | 5 | 4 | 7 | 8 |
| 4 | R—[Cy]—[Cy]—[Ph]—R' | | | 7 | 13 |
| 5 | OR—[Ph]—[Ph(F,F)]—OR' | 4 | 4 | | 12 |
| 6 | R—[Ph]—[Ph]—R' | 7 | 9 | | |
| 7 | R—[Ph]—[Ph(F,F)]—OR' | 6 | 6 | | |
| 8 | CH₂=CH—[Cy]—[Cy]—[Ph(F,F)]—OR' | 13 | 13 | 23 | |
| 9 | R—[Cy]—CH₂—O—[Ph(F,F)]—OR' | | | 13 | 8 |
| 10 | R—[Cy]—[Pyran-O]—[Ph(F,F)]—OR' | | | | 10 |
| 11 | R—[Cy]—[Ph]—[Ph(F,F)]—R | | | | 10 |

TABLE 2

| Liquid Crystal | Structure of Liquid Crystal | Exemplary Liquid Crystal Compositions (wt %) | | | | | | | | | |
|---|---|---|---|---|---|---|---|---|---|---|---|
| | | 5 | 6 | 7 | 8 | 9 | 10 | 11 | 12 | 13 | 14 |
| 1 | R—⌬—⌬—R' | 35.5 | 34 | 26.5 | 38 | 33 | 37.5 | 34 | 39 | 34 | 38 |
| 2 | R—⌬—⌬(F,F)—R' | 10 | 8 | 8 | 12 | 15 | 13.5 | 15 | 12 | 15.5 | 11.5 |
| 3 | R—⌬—⌬—⌬(F,F)—R' | 23 | 22 | 26 | 13 | 7 | 17 | 11.5 | 13 | 12 | 16 |
| 4 | R—⌬—⌬—⌬(F,F)—R' | 18 | 18 | 18 | 18 | 18.5 | 18 | 20.5 | 20 | 19.5 | 20 |
| 5 | R—⌬—⌬—R' | | | | | 9 | | | | | |
| 6 | R—⌬—⌬(F,F)—R' | 13 | 15 | 10 | | | | | | | |
| 7 | R—⌬—⌬(F,F)—⌬—R' | 0.5 | 3 | 2.5 | 2 | 10.5 | | 7 | | 7 | |
| 8 | R—⌬—⌬—⌬(F,F)—OR' | | | | 10 | 11 | 10 | 10 | 10 | 10 | 10 |
| 9 | R—⌬—⌬(F,F)—OR' | | | | 7 | 5 | 4 | 2 | 6 | 2 | 4.5 |

2. Physical Properties and Optical Properties of the Liquid Crystals According to the Difference in Dielectric Anisotropy Table 3 provides physical properties and optical properties of exemplary liquid crystals in a conventional PLS mode liquid crystal display device including liquid crystals having positive dielectric anisotropy and a PLS mode liquid crystal display device including exemplary liquid crystals having negative dielectric anisotropy. The liquid crystals having the positive dielectric anisotropy correspond to the liquid crystal composition of Example 3.

TABLE 3

| Item | | | Positive PLS | Negative PLS |
|---|---|---|---|---|
| Physical Properties of Liquid Crystal | 20° C. | d | 360 nm | 333 nm |
| | | Tni | 80.0 | 80.4 |
| | | $\Delta n$ | 0.1095 | 0.104 |
| | | $\Delta \epsilon$ | 9.1 | −3.75 |
| | | K11 | 12.9 | 15.64 |
| | | K33 | 13.9 | 16.52 |
| | | $\gamma_1$ (mPa·S) | 65 | 114 |

TABLE 3-continued

| Item | | | Positive PLS | Negative PLS |
|---|---|---|---|---|
| Optical Properties of Liquid Crystal | Vw, Luminance | Vw White Luminance | 3.5 V 100% | 4.5 V 127.0% |

In Table 3, Δn is a refractive index anisotropy, d is a cell gap, Tni is a nematic-isotropic phase transition temperature, Δ∈ is dielectric anisotropy, K11 and K33 are respectively splay elastic modulus and bending elastic modulus, $\gamma_1$ is rotational viscosity, and Vw is an applied voltage when white is to be displayed.

As can be seen from Table 3, the exemplary PLS mode liquid crystal display device including the liquid crystals having negative dielectric anisotropy has relatively higher white luminance than the conventional liquid crystal display device. In this manner, a contrast ratio is also relatively higher than in the comparative liquid crystal display device. It is noted that the liquid crystals having the positive dielectric anisotropy corresponds to the liquid crystal composition of Example 3; however, the liquid crystal compositions of Examples 1, 2, and 4 to 15 also show substantially the same or similar physical properties and optical properties.

3. Generation of Afterimages According to the use of an Additive

Table 4 provides the generation of line afterimages for the exemplary liquid crystal display device using liquid crystals having negative dielectric anisotropy when the additive of Chemical Formula 1 and/or Chemical Formula 6 is included or excluded in the liquid crystal. Here, the liquid crystal having the positive dielectric anisotropy corresponds to the liquid crystal composition of Example 3. In the following Table 4, no additive among the above Chemical Formula 1 and Chemical Formula 6 was included in the Comparative Example, about 200 ppm of the additive of Chemical Formula 1 is included in Example 1, and about 100 ppm and about 200 ppm of the additives of Chemical Formula 1 and Chemical Formula 6 are respectively included in Example 2.

TABLE 4

| | Generated Number of Line Afterimages/Evaluation Number | | |
|---|---|---|---|
| | 1 hr | 3.5 hr | 5 hr |
| Comparative Example | 0/5 | 4/5 | 5/5 |
| Example 1 | 0/5 | 0/5 | 0/5 |
| Example 2 | 0/5 | 0/5 | 0/5 |

Referring to Table 4, the exemplary liquid crystal display device excluding the additive in the liquid crystal layer LCL (i.e., the Comparative Example) shows the number of afterimages in 4 among 5 images after about 3.5 hours, and 5 among 5 images after about 5 hours. However, in the exemplary liquid crystal display device of Examples 1 and 2 including the additive according to exemplary embodiments, the afterimages were not found. As such, the afterimages are at least reduced in the liquid crystal display devices including the exemplary additive. It is noted that substantially the same or similar afterimage decreasing effects are realized when using liquid crystals having positive dielectric anisotropy in the compositions of Examples 1, 2, and 4 to 15, as well as the liquid crystal composition of Example 3.

3. Voltage Holding Ratio According to the use of an Additive

Figure 3:
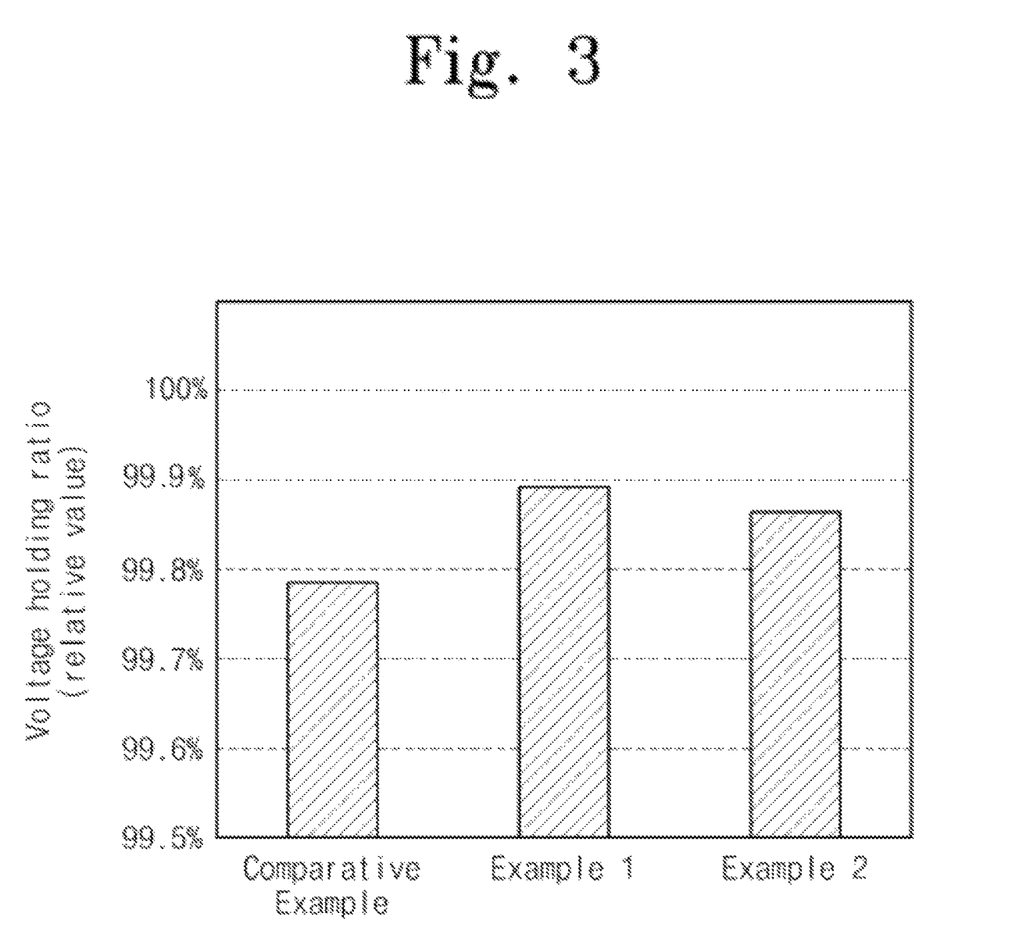
FIG. 3 is a graph comparing voltage holding ratios when the additives of Chemical Formula 1 and/or Chemical Formula 6 are included or excluded in a liquid crystal layer having negative dielectric anisotropy, according to exemplary embodiments.

FIG. 3 is a graph comparing voltage holding ratios when the additives of Chemical Formula 1 and/or Chemical Formula 6 are included or excluded in a liquid crystal layer having negative dielectric anisotropy, according to exemplary embodiments.

As seen in FIG. 3, no additive among the above Chemical Formula 1 and Chemical Formula 6 was included in the Comparative Example, about 200 ppm of the additive of Chemical Formula 1 is included in Example 1, and about 200 ppm and about 200 ppm of the additives of Chemical Formula 1 and Chemical Formula 6 are respectively included in Example 2. In this manner, the voltage holding ratio of about 99.8% or less was shown in the Comparative Example. The voltage holding ratio of about 99.9% was shown for Examples 1 and 2 in which the liquid crystal includes the additive according to exemplary embodiments. As such, the voltage holding ratio is confirmed to be increased when the additive according to exemplary embodiments is included.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display device, comprising:
a first substrate comprising at least one electrode configured to form an electric field;
a second substrate facing the first substrate; and
a liquid crystal layer disposed between the first substrate and the second substrate,
wherein the liquid crystal layer comprises a liquid crystal composition comprising:
a first additive represented by the following Chemical Formula 1:

(Chemical Formula 1)

and
liquid crystals of negative dielectric anisotropy represented by the following Chemical Formula 5:

(Chemical Formula 5)

wherein R and R' each represents an alkyl group or an alkenyl group having 1 to 5 carbon atoms; and
R and R' are not both an alkyl group.

2. The liquid crystal display device of claim 1, wherein:
the at least one electrode comprises a pixel electrode and a common electrode insulated from the pixel electrode; and
respective portions of the common electrode and the pixel electrode overlap one another when viewed in a plan view.

3. The liquid crystal display device of claim 2, wherein:
the common electrode is a plate-shaped common electrode; and
the pixel electrode comprises a stem part and branch parts extending from the stem part.

4. The liquid crystal display device of claim 2, wherein:
the pixel electrode is a plate-shaped pixel electrode; and
the common electrode comprises a stem part and branch parts extending from the stem part.

5. The liquid crystal display device of claim 1, wherein the concentration of the first additive ranges from about 100 ppm to about 1,000 ppm based on a total amount of the liquid crystal composition.

6. The liquid crystal display device of claim 5, wherein the liquid crystal composition comprises an alkenyl-based liquid crystal.

7. The liquid crystal display device of claim 6, wherein:
the liquid crystal composition further comprises at least one of the liquid crystals represented by the following Chemical Formula 2:

R and R' each represent an alkyl group or an alkenyl group having 1 to 5 carbon atoms; and
R and R' are not both an alkyl group.

8. The liquid crystal display device of claim 7, wherein:
the liquid crystal composition further comprises at least one of the liquid crystals represented by the following Chemical Formula 3:

R and R' each represents an alkyl group or an alkenyl group having 1 to 5 carbon atoms; and
R and R' are not both an alkyl group.

9. The liquid crystal display device of claim 6, wherein:
the liquid crystal composition further comprises at least one of the liquid crystals represented by the following Chemical Formula 4:

R and R' each represents an alkyl group or an alkenyl group having 1 to 5 carbon atoms; and
R and R' are not both an alkyl group.

10. The liquid crystal display device of claim 9, wherein:
the liquid crystals further comprises at least one of liquid crystals represented by the following:

R and R' each represents an alkyl group or an alkenyl group having 1 to 5 carbon atoms; and
R and R' are not both an alkyl group.

11. The liquid crystal display device of claim 6, wherein:
the liquid crystal composition further comprises a second additive; and
the second additive is a phenolic antioxidant.

12. The liquid crystal display device of claim 11, wherein:
the second additive is represented by the following Chemical Formula 6:

and
w is 1 to 15.

13. A liquid crystal composition, comprising:
a first additive represented by the following Chemical Formula 1:

(Chemical Formula 1)

and
liquid crystals of negative dielectric anisotropy represented by the following Chemical Formula 5:

(Chemical Formula 5)

wherein R and R' each represents an alkyl group or an alkenyl group having 1 to 5 carbon atoms; and
R and R' are not both an alkyl group.

14. The liquid crystal composition of claim 13, wherein the concentration of the first additive ranges from about 100 ppm to about 1,000 ppm based on a total amount of the liquid crystal composition.

15. The liquid crystal composition of claim 14, wherein the liquid crystal composition comprises an alkenyl-based liquid crystal.

16. The liquid crystal composition of claim 15, wherein:
the liquid crystal composition further comprises at least one of the liquid crystals represented by the following Chemical Formula 2:

R and R' each represent an alkyl group or an alkenyl group having 1 to 5 carbon atoms; and
R and R' are not both an alkyl group.

17. The liquid crystal composition of claim 16, wherein:
the liquid crystal composition further comprises at least one of the liquid crystals represented by the following Chemical Formula 3:

-continued

R and R' each represents an alkyl group or an alkenyl group having 1 to 5 carbon atoms; and
R and R' are not both an alkyl group.

18. The liquid crystal composition of claim 15, wherein:
the liquid crystal composition further comprises at least one of the liquid crystals represented by the following Chemical Formula 4:

R and R' each represents an alkyl group or an alkenyl group having 1 to 5 carbon atoms; and
R and R' are not both an alkyl group.

19. The liquid crystal composition of claim 18, wherein:
the liquid crystal further comprises at least one of liquid crystals represented by the following:

R and R' each represents an alkyl group or an alkenyl group having 1 to 5 carbon atoms; and
R and R' are not both an alkyl group.

20. The liquid crystal composition of claim 15, wherein:
the liquid crystal composition further comprises a second additive; and
the second additive is a phenolic antioxidant represented by the following Chemical Formula 6:

and
w is 1 to 15.

21. The liquid crystal display device of claim 1, wherein the liquid crystal composition further comprises a derivative of the first additive represented by Chemical Formula 1.

22. The liquid crystal composition of claim 13, further comprising a derivative of the first additive represented by Chemical Formula 1.

* * * * *